UNITED STATES PATENT OFFICE.

SAMUEL R. SCOGGINS, OF BALTIMORE, MARYLAND.

COUGH-SIRUP.

SPECIFICATION forming part of Letters Patent No. 283,029, dated August 14, 1883.

Application filed January 4, 1883. (No specimens.)

*To all whom it may concern:*

Be it known that I, SAMUEL R. SCOGGINS, a citizen of the United States, and a resident of Baltimore, Maryland, have invented a new and improved medical compound for the cure of coughs, colds, rheumatism, dyspepsia, &c., of which the following is a specification.

I take three gallons of maple-sugar sirup, one gallon of California brandy, four ounces of fluid extract of buchu, four ounces of the fluid extract of wild cherry, four ounces of the fluid extract of hoarhound, four ounces of the fluid extract of sarsaparilla, four ounces of sweet spirits of niter, and four ounces of paregoric. The maple sirup is heated, and the other ingredients are poured in and thoroughly mixed. I find this compound to be an excellent remedy for the diseases named, and one that will keep any length of time.

I use this medicine internally, a dose for an adult being a tablespoonful three times a day, before eating, the dose gradually decreasing down to four to eight drops for a child under one year of age.

Having thus fully described my compound, what I claim and desire to secure by Letters Patent of the United States, is—

The medical compound herein described, consisting of maple-sugar sirup, California brandy, extract of buchu, extract of wild cherry, extract of hoarhound, extract of sarsaparilla, sweet spirits of niter, and paregoric in the proportions named, and compounded in the manner set forth.

In witness whereof I have hereunto set my hand in presence of two subscribing witnesses.

SAMUEL R. SCOGGINS.

Witnesses:
S. BRASHEARS,
JNO. T. MADDOX.